(12) United States Patent
Yang

(10) Patent No.: US 6,390,540 B1
(45) Date of Patent: May 21, 2002

(54) SIDE FRAME REINFORCEMENT STRUCTURE FOR VEHICLE

(75) Inventor: Chul-ho Yang, Anyang-shi (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/592,675

(22) Filed: Jun. 13, 2000

(30) Foreign Application Priority Data

Jun. 30, 1999 (KR) .............................................. 99-25967

(51) Int. Cl.⁷ .............................................. B62D 27/02
(52) U.S. Cl. ............. 296/192; 296/203.02; 296/203.03; 296/188
(58) Field of Search ................................ 296/192, 194, 296/198, 188, 189, 203.02, 203.03, 30

(56) References Cited

U.S. PATENT DOCUMENTS

| | | | | |
|---|---|---|---|---|
| 4,270,793 A | * | 6/1981 | Harasaki et al. ............. | 296/192 |
| 4,332,187 A | * | 6/1982 | Imai et al. ............... | 296/192 X |
| 4,545,612 A | * | 10/1985 | Harasaki .................. | 296/192 X |
| 4,699,419 A | * | 10/1987 | Kawase et al. ............. | 296/192 |
| 4,807,925 A | * | 2/1989 | Sakamoto et al. ........... | 296/194 |
| 5,042,872 A | * | 8/1991 | Yoshii ..................... | 296/194 X |

* cited by examiner

Primary Examiner—Joseph D. Pape
Assistant Examiner—Jason Morrow
(74) Attorney, Agent, or Firm—Birch, Stewart, Kolasch & Birch, LLP

(57) ABSTRACT

Disclosed is a side frame reinforcement structure for a vehicle. The side frame reinforcement structure for a vehicle comprises a reinforcing member bent in a multi-stepwise manner, the reinforcing member having a lower end which is welded onto an upper surface of a cowl dash panel adjacent to an end of the cowl dash panel and an upper end which is welded to a side frame which in turn is welded to the end of the cowl dash panel, the reinforcing member cooperating with the cowl dash panel and the side frame thereby to define a closed space.

1 Claim, 2 Drawing Sheets

- PRIOR ART -

SIDE FRAME REINFORCEMENT STRUCTURE FOR VEHICLE

BACKGROUND OF THE INVENTION

1. Field of the Invention

The present invention relates to a side frame reinforcement structure for a vehicle, and more particularly, the present invention relates to a side frame reinforcement structure for a vehicle, which increases rigidity of a welding portion where a cowl dash panel and a side frame forming a side of the vehicle are coupled with each other, thereby minimizing, upon collision, deformation of the side frame and the cowl dash panel and ensuring safety of a passenger.

2. Description of the Related Art

Generally, between an engine room which is defined at a front part of a vehicle and a passenger compartment, there is disposed a cowl dash panel. A pair of side frames which are respectively located at both front sides of the vehicle, are welded to both left and right ends of the cowl dash panel, respectively.

However, in the conventional art, as can be readily seen from FIG. 1, because a pair of side frames 20 are arranged in a manner such that they are simply welded to both left and right ends of a cowl dash panel 10, respectively, in the case that a head-on collision occurs at a point which is deviated from a center of a vehicle while the vehicle runs on the road, the side frame 20 is likely to be deformed. Therefore, as the side frame 20 which is deformed by the head-on collision is pushed toward a passenger compartment, injury potential to a passenger seated inside the passenger compartment cannot but be increased.

SUMMARY OF THE INVENTION

Accordingly, the present invention has been made in an effort to solve the problems occurring in the related art, and an object of the present invention is to provide a side frame reinforcement structure for a vehicle, which increases rigidity of a connecting portion between a cowl dash panel and a side frame, thereby ensuring, upon collision, safety of a passenger seated inside a passenger compartment.

In order to achieve the above object, according to the present invention, there is provided a side frame reinforcement structure for a vehicle, comprising: a reinforcing member bent in a multi-stepwise manner, the reinforcing member having a lower end which is welded onto an upper surface of a cowl dash panel adjacent an end of the cowl dash panel and an upper end which is welded to a side frame which in turn is welded to the end of the cowl dash panel, the reinforcing member cooperating with the cowl dash panel and the side frame thereby to define a closed space.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
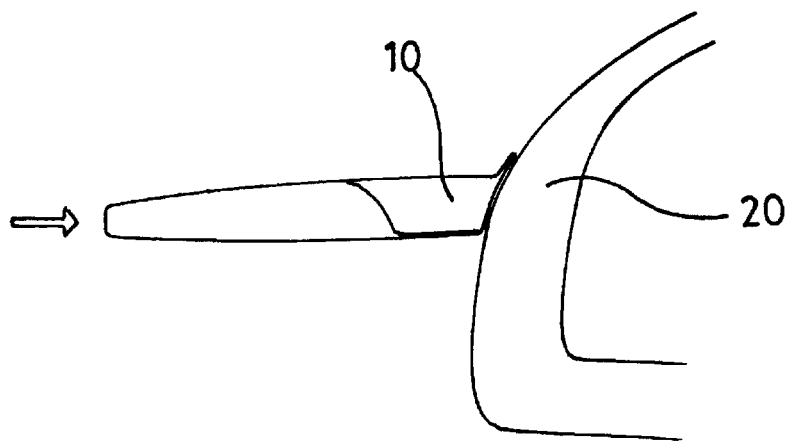
FIG. 1 is a schematic side view illustrating a state wherein a side frame is welded to an end of a cowl dash panel.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
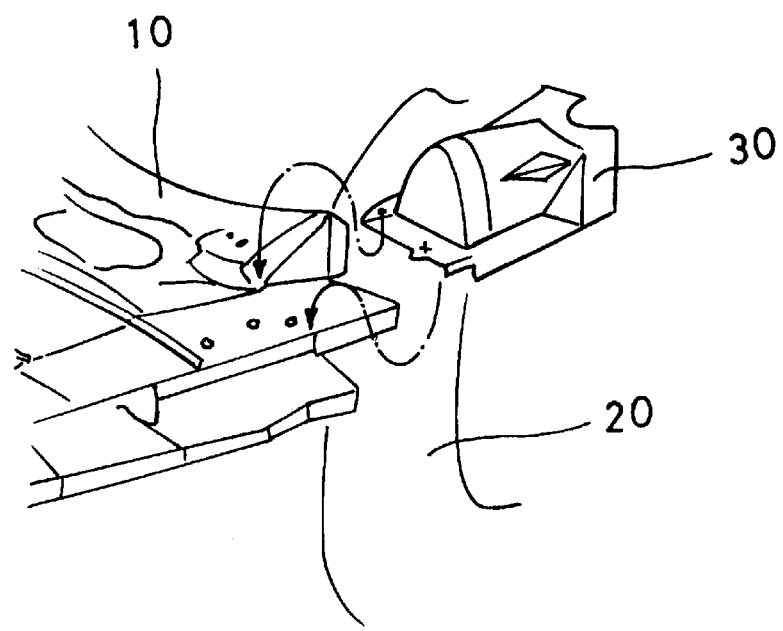
FIG. 2 is an exploded perspective view illustrating a side frame reinforcement structure for a vehicle in accordance with an embodiment of the present invention, which is not welded to a cowl dash panel and a side frame.
Figure 3:
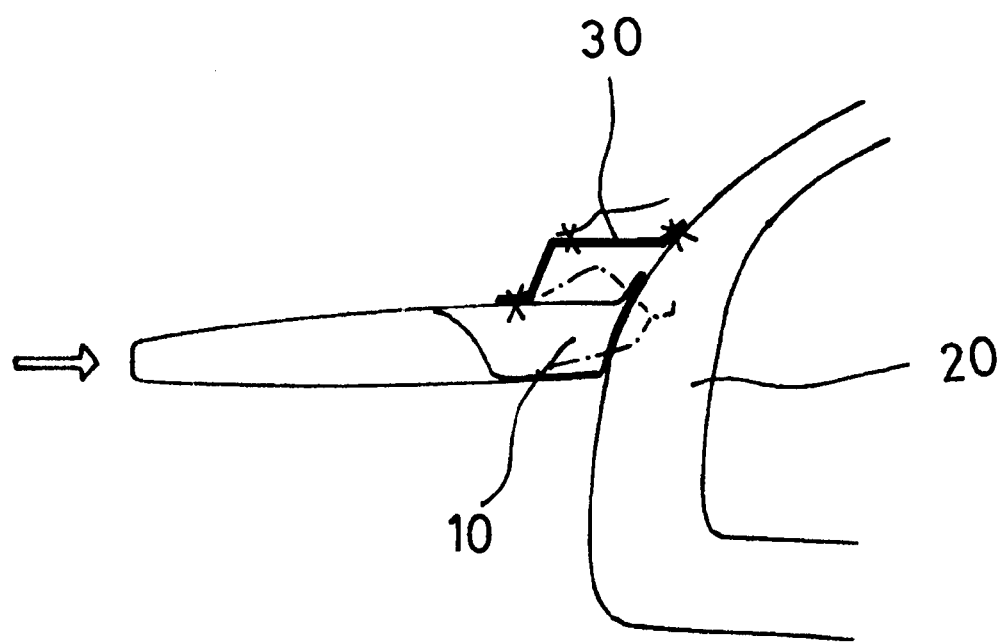
FIG. 3 is a schematic side view similar to FIG. 1, illustrating another state wherein the side frame reinforcement structure according to the present invention is welded to the cowl dash panel and the side frame.

As shown in FIGS. 2 and 3, a side frame reinforcement structure for a vehicle, in accordance with an embodiment of the present invention includes a reinforcing member 30. The reinforcing member 30 possesses a configuration which is bent in a multi-stepwise manner. The reinforcing member 30 has a lower end which is welded onto an upper surface of a cowl dash panel 10 adjacent to an end of the cowl dash panel 10 and an upper end which is welded to a side frame 20 (corresponding to a front pillar) which in turn is welded to the end of the cowl dash panel 10. The reinforcing member 30 cooperates with the cowl dash panel 10 and the side frame 20, thereby to define a closed space.

In the side frame reinforcement structure for a vehicle, constructed as mentioned above, by the fact that the reinforcing member 30 which is bent in a multi-stepwise manner, is welded to the cowl dash panel 10 and the side frame 20, respectively, adjacent to a welding portion between the cowl dash panel 10 and the side frame 20 while defining the closed space in cooperation with the cowl dash panel 10 and the side frame 20, if collision occurs when the vehicle runs on the road and thereby impact is exerted to the vehicle from a front of the vehicle, because the reinforcing member 30 generates, while being supported by the side frame 20, supporting force acting in a direction toward the front of the vehicle which is opposite to a direction along which the impact is exerted to the vehicle, the impact is effectively absorbed and deformation of the side frame 20 is minimized.

Also, in the case that impact is exerted to the vehicle from a side of the vehicle, impact energy is primarily absorbed by the side frame 20, and the impact energy which remains after being absorbed by the side frame 20 is secondarily absorbed by the closed space which is defined due to the fact that the reinforcing member 30 is welded to the cowl dash panel 10 and the side frame 20. Finally, the impact energy which still remains after being absorbed by the closed space, is absorbed by the cowl dash panel 10 in a state wherein it is distributed over a wide area.

As described above, the side frame reinforcement structure for a vehicle according to the present invention, constructed as mentioned above, provides advantages in that, when collision occurs while a vehicle runs on the road and thereby impact is exerted to the vehicle from a widthwise direction or a lengthwise direction of the vehicle, a side frame which forms a side of the vehicle, is prevented from being deformed and from being pushed toward a passenger compartment, whereby safety of a passenger seated inside the passenger compartment is assured.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A side frame reinforcement structure for a vehicle, comprising:

a reinforcing member bent in a multi-stepwise manner, the reinforcing member having a lower end which is welded onto an upper surface of a cowl dash panel adjacent to an end of the cowl dash panel and an upper end which is welded to a side frame which in turn is welded to the end of the cowl dash panel, the reinforcing member cooperating with the cowl dash panel and the side frame thereby to define a closed space.

* * * * *